(12) United States Patent
Kitayama et al.

(10) Patent No.: US 6,228,946 B1
(45) Date of Patent: May 8, 2001

(54) BLOCK COPOLYMER AND POLYMER COMPOSITION COMPRISING THE SAME

(75) Inventors: Koji Kitayama, Kashima-gun; Kenichi Hamada, Tsukuba; Makoto Akai, Tsukuba; Kazushige Ishiura, Tsukuba, all of (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/343,519

(22) Filed: Jun. 30, 1999

(30) Foreign Application Priority Data

Jul. 3, 1998 (JP) .................................................. 10-204311

(51) Int. Cl.$^7$ ...................................................... C08F 25/02
(52) U.S. Cl. ................................................................ 525/242
(58) Field of Search ............................................... 525/242

(56) References Cited

FOREIGN PATENT DOCUMENTS

| | | |
|---|---|---|
| 0 298 667 | 1/1989 | (EP) . |
| 0 716 124 | 6/1996 | (EP) . |
| WO 97/00292 | 1/1997 | (WO) . |
| WO 97/41160 | 11/1997 | (WO) . |
| WO 98/15584 | 4/1998 | (WO) . |

*Primary Examiner*—Terressa M. Boykin
(74) *Attorney, Agent, or Firm*—Oblon, Spivak, McClelland, Maier & Neustradt, P.C.

(57) ABSTRACT

A block copolymer comprising, in a main chain thereof, a crystalline polymer block A obtained by hydrogenation of at least 80% of unsaturated bonds of a butadiene-based polymer block having a 1,2-bond content less than 20%, a polymer block B having a glass transition point of 20° C. or lower and a polymer block C composed mainly of a methacrylate ester unit and/or an acrylate ester unit and having a glass transition point exceeding 20° C. has good elastomeric properties, excellent weather resistance, solvent resistance and heat resistance and has good affinity with each of a polar polymer and non-polar polymer. A polymer composition comprising said block copolymer effectively exhibits the above-described characteristics of the block copolymer.

7 Claims, 2 Drawing Sheets

BLOCK COPOLYMER AND POLYMER COMPOSITION COMPRISING THE SAME

BACKGROUND OF THE INVENTION

1. Field of the Invention

This invention relates to a novel block copolymer and a copolymer composition comprising the same.

The block copolymer according to the present invention has properties of a thermoplastic elastomer and in addition, is excellent in affinity with a polar polymer typified by poly(methyl methacrylate) (PMMA), ABS resin and polycarbonate (PC), affinity with a non-polar polymer typified by polyethylene, weather resistance, solvent resistance and heat resistance. Said block copolymer can therefore be used singly as a molding or forming material and also can be added to another polymer as a modifier (ex. polarity imparting agent) or to a polymer composition comprising a polar polymer and a non-polar polymer as a compatibilizer.

2. Related Art of the Invention

As a readily moldable or formable elastomeric material, thermoplastic elastomers have been employed for various purposes such as automotive parts, electronic or electrical parts and construction or civil engineering materials. Particularly, a styrene-based thermoplastic elastomer (which may hereinafter be called "styrene-based TPE") typified by a polystyrene-polybutadiene-polystyrene block copolymer (SBS), polystyrene -hydrogenated polybutadiene-polystyrene block copolymer (SEBS) or polystyrene-hydrogenated polyisoprene-polystyrene block copolymer (SEPS) is a widely usable industrial material, because according to using purpose, the most suitable one can be selected from those different in stress-strain properties and the like, more specifically, those ranging from a vulcanized-rubber-like material to a plastic-like material [refer to, for example, Kouei KOMATSU, "*Thermoplastic Elastomers— Basis, Application, Market and Future Prospects—*" (published by Nikkan Kogyo Shimbunsha on Oct. 30, 1995)].

The styrene-based TPE, however, is poor in weather resistance and solvent resistance. As a thermoplastic elastomer improved in such properties, proposed are a block copolymer comprising a block of a hydrogenation product of a polybutadiene having a high 1,4-bond content and a block of a hydrogenation product of a polybutadiene having a high 1,2-bond content, and a block copolymer comprising a block of a hydrogenation product of a polybutadiene having a high 1,4-bond content, a block of a hydrogenation product of a polybutadiene having a high 1,2-bond content and a polystyrene block (which will hereinafter be called "hydrogenated 1,4-polybutadiene-based TPE", collectively) (refer to *Macromolecules,* 4(2), 152–154 (1971), U.S. Pat. No. 5,206, 301, U.S. Pat. No. 5,216,074, etc.).

A polyolefin-based thermoplastic elastomer is prepared by copolymerizing ethylene and a long-chain α-olefin (ex. 1-octene) in the presence of a metallocene type polymerization catalyst (which elastomer may hereinafter be called "metallocene-based TPE"). This metallocene-based TPE exhibits its elastomeric properties by cohesion based on the crystallinity of its polyethylene moiety. Partly because it can be prepared at a low cost, it has started to be used widely for imparting a polyolefin-based material or recycled material thereof with tenacity.

Although the styrene-based TPE is inferior in weather resistance and solvent resistance as described above, its alloy with an acrylic resin which is, on the contrary, excellent in such properties has been proposed as a flexible material having good weather resistance and solvent resistance.

In addition, proposed are a block copolymer comprising a hydrogenated polymer block of a conjugated diene compound and a polymer block of a methacrylate ester, and a block copolymer comprising a hydrogenated polymer block of a conjugated diene compound, a polymer block of a methacrylate ester and a polymer block of an aromatic vinyl compound (which may hereinafter be called "methacrylate ester-noncrystalline hydrogenated diene-based block copolymer" collectively) (refer to European Patent Application Publication No. 0431706, U.S. Pat. No. 5,278,245, etc.).

The above-described hydrogenated 1,4-polybutadiene-based TPE or metallocene-based TPE cannot be used freely because of low affinity, and therefore, insufficient compatibility and adhesion to a polar polymer such as acrylic resin. The metallocene-based TPE is accompanied with the drawback that it has insufficient heat resistance and can exhibit only poor properties under high-temperature conditions compared with room-temperature conditions.

The above-described alloy of a styrene-based TPE with an acrylic resin is inferior in heat resistance, leading to low evaluation results in the test of compression set.

The above-described methacrylate ester-noncrystalline hydrogenated diene-based block copolymer is accompanied with such a drawback as inferior solvent resistance.

SUMMARY OF THE INVENTION

An object of the present invention is to provide a novel polymer having good elastomeric properties, excellent weather resistance, solvent resistance and heat resistance and good affinity with both a polar polymer and a non-polar polymer. Another object of the present invention is to provide a novel polymer composition which comprises the novel polymer as a base material, a modifier or compatibilizer, making good use of the above-described characteristics of the polymer.

According to the present invention, one of the objects of the present invention can be attained by providing a block copolymer comprising, in a main chain thereof, at least one polymer block A, at least one polymer block B and at least one polymer block C, said polymer block A being obtained by hydrogenation of at least 80% of unsaturated bonds of a butadiene-based polymer block having a 1,2-bond content less than 20% and having crystallinity; said polymer block B having a glass transition point of 20° C. or lower; and said polymer block C being composed mainly of a methacrylate ester unit or an acrylate ester unit and having a glass transition point exceeding 20° C.

According to the present invention, the other object can be attained by providing a polymer composition comprising said block copolymer and at least one another polymer.

DETAILED DESCRIPTION OF THE INVENTION

The block copolymer according to the present invention comprises, in the main chain thereof, at least one polymer block A (which may hereinafter be called "block A"), at least one polymer block B (which may hereinafter be called "block B") and at least one polymer block C (which may hereinafter be called "block C").

The block A constituting the block copolymer of the present invention is formed by hydrogenating unsaturated bonds of the butadiene-based polymer block. It is important that the butadiene unit in the butadiene-based polymer block before hydrogenation has a 1,2 bond content less than 20% (0% is possible), at least 80% (100% is possible) of the unsaturated bonds is hydrogenated and the polymer block after hydrogenation has crystallinity. Although the confirmation method of crystallinity is not essentially limited, the polymer block is judged to have crystallinity when an endothermic peak is observed upon heating up and an exothermic peak is observed upon cooling in differential scanning calorimetry.

When the block A is amorphous, it loses its properties as the hard block of a thermoplastic elastomer and the block copolymer available from it does not exhibit functions as a thermoplastic elastomer. The block A having no crystallinity is not desired. 1,2-Bond contents of the butadiene-based polymer block before hydrogenation not less than 20% are not preferred, because the block A after hydrogenation loses its crystallinity and inconveniences similar to the above-described ones occur. Hydrogenation ratios of unsaturated bonds in the butadiene-based polymer block less than 80% are also not preferred, because the butadiene-based polymer block loses its function as the hard block of a thermoplastic elastomer and weather resistance and heat resistance are impaired in the resulting block copolymer. From such viewpoints, it is particularly preferred that concerning block A, a 1,2 bond content in the butadiene unit of the butadiene-based polymer block before hydrogenation is 15% or less (0% is possible) and at least 90% (100% is possible) of its unsaturated bonds has been hydrogenated.

In the present invention, it should be noted that the butadiene-based polymer block of block A before hydrogenation is composed mainly of butadiene units [more than 80% of the butadiene units is a 1,4-bond butadiene unit (—CH$_2$—CH=CH—CH$_2$—), while less than 20% of them is a 1,2-bond butadiene unit (— CH(CH=CH$_2$)—CH$_2$—)], however, it may contain a structural unit derived from another monomer such as diene, aromatic vinyl compound, methacrylate or acrylate in an amount within an extent not damaging the advantages of the present invention.

The block B constituting the block copolymer of the present invention is a polymer block having a glass transition point of 20° C. or lower. Glass transition points exceeding 20° C. are not preferred, because they impair the properties of the block B as a soft block of a thermoplastic elastomer and prevent the resulting block copolymer from exhibiting a function as a thermoplastic elastomer. It is therefore more preferred that the block B has a glass transition point not higher than 10° C.

It should be noted that the glass transition point of the block B in the present invention is a temperature at which a change in specific heat due to the glass transition of the block B is recognized when the block copolymer is subjected to differential scanning calorimetry at a heating rate of 10° C./min.

The block B may be composed of a homopolymer consisting of identical monomer units or of a copolymer consisting of several kinds of monomer units insofar as the glass transition point of the block B can be observed at a substantially single temperature not higher than 20° C.

Examples of the polymer constituting the block B include diene-based polymers such as polybutadiene having a 1,2-bond content of at least 20% (100% is possible) [preferably, polybutadiene having a 1,2-bond content of at least 30% (100% is possible)] and polyisoprene; methacrylate ester polymers such as poly(hexyl methacrylate), poly(octyl methacrylate), poly(decyl methacrylate), poly(lauryl methacrylate), poly (2-ethylhexyl methacrylate) and poly(2-methoxyethyl methacrylate); and acrylate ester polymers such as poly(ethyl acrylate), poly(propyl acrylate), poly (isopropyl acrylate), poly(butyl acrylate), poly(s-butyl acrylate), poly(heptyl acrylate), poly(3-pentyl acrylate), poly(hexyl acrylate), poly(octyl acrylate), poly(decyl acrylate), poly(lauryl acrylate), poly(2-ethylhexyl acrylate) and poly(2-methoxyethyl acrylate). When the block B is composed of the above-exemplified diene-based polymer, it is preferred from the viewpoint of weather resistance of the resulting block copolymer that at least 80% (100% is possible) of unsaturated bonds of the diene-based polymer has been hydrogenated, with the hydrogenation ratio of at least 90% (100% is possible) being particularly preferred. The above-exemplified polymers may each be copolymerized with another monomer such as diene, aromatic vinyl compound, methacrylate or acrylate within an extent permitting the glass transition point of 20° C. or lower.

The block C constituting the block copolymer of the present invention is a polymer block composed mainly of a methacrylate ester unit or an acrylate ester unit and having a glass transition point exceeding 20° C. It should be noted that the glass transition point of the block C is a temperature at which a change in a specific heat due to the glass transition of the block C is recognized when the block copolymer is subjected to differential scanning calorimetry at a heating rate of 10° C./min.

The block C contains a methacrylate ester unit and/or an acrylate ester unit preferably in a total weight of at least 80 wt. % (100 wt. % is possible), more preferably at least 90 wt. % (100 wt. % is possible). Glass transition points of the block C not higher than 20° C. are not preferred, because they impair the properties of the block C as a hard block of a thermoplastic elastomer and prevent the resulting block copolymer from exhibiting the function as a thermoplastic elastomer. From the foregoing in view, the block C is preferred to have a glass transition point of at least 40° C.

Preferred examples of the polymer constituting the block C include methacrylate ester polymers such as poly(methyl methacrylate), poly(ethyl methacrylate), poly(propyl methacrylate), poly(s-butyl methacrylate), poly(t-butyl methacrylate), poly(cyclohexyl methacrylate), poly (isobornyl methacrylate) and poly(glycidyl methacrylate); and acrylate ester polymers such as poly(t-butyl acrylate), poly(cyclohexyl acrylate) and poly(isobornyl acrylate). The block C may contain, in addition to the methacrylate ester unit and/or acrylate ester unit, a structural unit derived from another monomer such as butadiene within an extent permitting the glass transition point exceeding 20° C.

Although the sequence of the block A, block B and block C in the block copolymer of the present invention is not essentially limited, preferred is the block copolymer having, in at least a part of its main chain, at least one polymer block B sandwiched between at least one polymer block A and at least one polymer block C; and more preferred is the block copolymer having, in at least a part of its main chain, a structure represented by the formula: [A]—[B]—[C], wherein [A] represents the polymer block A, [B] represents the polymer block B, [C] represents the polymer block C and a solid line (—) stands for direct chemical bonding of polymer blocks at both ends of the solid line or bonding via a partial structure derived from a coupling agent.

The block copolymer of the present invention may contain, at the end of its main chain or at its side chain, a functional group such as hydroxyl, carboxyl, amino or epoxy. Moreover, the block copolymer of the present invention may contain, in its molecular main chain, a polymer block different from any one of the block A, block B and block C or a partial structure derived from a coupling agent such as 1,2-dibromoethane, bis(bromomethyl)benzene, silicon tetrachloride or tin tetrachloride.

As typical examples of polymer block combinations in the block copolymer of the present invention, following (1) to (8) can be mentioned.

(1) (hydrogenation product of polybutadiene having a low 1,2-bond content)-(hydrogenation product of polybutadiene having a high 1,2-bond content)-(poly(methyl methacrylate))

(2) (hydrogenation product of polybutadiene having a low 1,2-bond content)-(hydrogenated polyisoprene)-(poly(methyl methacrylate))

(3) (hydrogenation product of polybutadiene having a low 1,2-bond content)-(hydrogenated isoprene-butadiene copolymer)-(poly(methyl methacrylate))

(4) (hydrogenation product of polybutadiene having a low 1,2-bond content)-(poly(lauryl methacrylate))-(poly(methyl methacrylate))

(5) (hydrogenation product of polybutadiene having a low 1,2-bond content)-(poly(2-ethylhexyl methacrylate))-(poly(methyl methacrylate))

(6) (hydrogenation product of polybutadiene having a low 1,2-bond content)-(poly(n-butyl acrylate))-(poly(methyl methacrylate))

(7) (hydrogenation product of polybutadiene having a low 1,2-bond content)-(hydrogenation product of polybutadiene having a high 1,2-bond content)-(hydrogenated polybutadiene)-(poly(methyl methacrylate))

(8) (hydrogenation product of polybutadiene having a low 1,2-bond content)-(hydrogenated isoprene-butadiene copolymer)-(hydrogenated polybutadiene)-(poly(methyl methacrylate))

Although the number-average molecular weight of the block copolymer of the present invention is not essentially limited, it is preferably within a range of from 20000 to 1000000. The block copolymer of the present invention preferably has a molecular weight distribution, which is expressed by a (weight-average molecular weight)/(number-average molecular weight) ratio, falling within a range of 1.0 to 2.0. Although the number-average molecular weight of each polymer block is not essentially limited, those of the block A before hydrogenation, the block B and the block C preferably fall within ranges of 1000 to 300000, 8000 to 900000 and 1000 to 300000, respectively. The content of each polymer block in the block copolymer of the present invention is not always limited, however, the content of the block A before hydrogenation (when the block copolymer contains plural blocks A, the sum of their contents before hydrogenation) preferably falls within a range of 5 to 60 wt. %; that of the block B (when the block copolymer contains plural blocks B, the sum of their contents) preferably falls within a range of 30 to 90 wt. % and that of the block C (when the block copolymer contains plural blocks C, the sum of their contents) preferably falls within a range of 5 to 40 wt. %, each based on the block copolymer before hydrogenation.

Although the preparation process of the block copolymer of the present invention is not always limited, it can be prepared by successively forming given polymer blocks such as block A before hydrogenation, block B and block C, thereby forming a block copolymer precursor; and then subjecting the resulting block copolymer precursor to hydrogenation.

The polymerization to obtain the above-described block copolymer precursor can be carried out under the conditions ordinarily employed for anionic polymerization. Usually, the polymerization is carried out at a temperature ranging from −100 to +100° C. for 0.01 to 200 hours. The polymerization system is preferably under an inert gas atmosphere such as dried argon or nitrogen gas.

Although the polymerization initiator for the above-described anionic polymerization is not always limited, a proper one can be selected from ordinary polymerization initiators which permit anionic polymerization of butadiene. Examples of the initiator include alkali metals such as metallic sodium and metallic lithium and organic alkali metal compounds such as methyl lithium, ethyl lithium, n-butyl lithium and s-butyl lithium.

In the above-described anionic polymerization, a proper solvent selected from those usable in the ordinary anionic polymerization can be used. Accordingly, upon a series of polymerization procedures for the formation of the block A before hydrogenation, the block B and the block C, it is possible to exchange a solvent or add an additive or solvent as needed during the polymerization with a view to obtaining the polymer blocks which can satisfy the above-described respective conditions concerning a 1,2-bond contents and glass transition point.

A description will hereinafter be made of by using, as an example, a process which comprises polymerizing block A before hydrogenation, block B and block C, thereby forming a block copolymer precursor having these blocks in the order of mention.

No limitation is imposed on the solvent to be used upon polymerization for the formation of a block A precursor before hydrogenation insofar as it can control the 1,2-bond content of butadiene to less than 20%. A hydrocarbon solvent is ordinarily employed. Examples of the hydrocarbon solvent include hexane, cyclohexane, methylcyclohexane, benzene and toluene. A solvent mixture or additive-added solvent may be employed within an extent permitting the control of a 1,2-bond content of butadiene to less than 20%.

Since the conditions suitable for the solvent, additive or the like in the polymerization for the formation of the block B or precursor thereof are different depending on the monomers employed, it is recommended to select the conditions as needed according to the kind of the monomers employed. For example, when a polyisoprene block is formed as the block B, polymerization can be carried out by directly adding isoprene to the reaction system after polymerization for the formation of the above-described block A precursor is completed. A polybutadlene block having a 1,2-bond content of at least 20% can be formed by adding a predetermined amount of a polar compound typified by an ether such as diethyl ether, anisole or tetrahydrofuran, or an amine such as triethylamine, N,N,N',N'-tetramethylethylenediamine to the reaction system after polymerization for the formation of the above-described block A precursor is completed and then adding butadiene to the resulting mixture. The polymer block B mainly composed of a methacrylate ester unit and/or an acrylate ester unit typified by a poly(lauryl methacrylate) block or poly (n-butyl acrylate) block and having a glass transition point not higher than 20° C.; or a precursor thereof can be formed by adding, for example, 1,1-diphenylethylene to the reaction system after polymerization for the formation of the block A precursor is completed, cooling the resulting system to about −80° C., adding a polar solvent, such as tetrahydrofuran, from which impurities have been removed sufficiently, and then adding a monomer composed mainly of a specific methacrylate ester and/or acrylate ester, thereby initiating polymerization reaction; or by adding an organoaluminum compound to the reaction system after polymerization for the formation of the block A precursor is completed and then adding a monomer composed mainly of a specific methacrylate ester and/or acrylate ester, thereby initiating polymerization reaction.

A solvent to be used upon polymerization for the formation of the block C is selected from those which permit the formation of a polymer chain having a glass transition point exceeding 20° C., from monomers composed mainly of a methacrylate ester and/or acrylate ester. The target block C can be formed, for example, by adding a polar solvent such as tetrahydrofuran, from which impurities have been sufficiently removed, to the reaction system after polymerization for the formation of the block B is completed and then adding a specific monomer to initiate polymerization; or by adding an organoaluminum compound to the reaction system after polymerization for the formation of the block B is completed and then adding a specific monomer to initiate polymerization.

In order to obtain a block copolymer having, in addition to the block A, block B and block C, another polymer block, it is only necessary to add a polymerization step for the formation of said another polymer block at a predetermined stage in the above-described multi-stage anionic polymerization. It is also possible to add to the reaction system a coupling agent such as 1,2-dibromoethane, bis(bromomethyl)benzene, silicon tetrachloride or tin tetrachloride in a conventional manner after the completion of the above-described series of anionic polymerization procedures, thereby coupling the polymers.

The block copolymer of the present invention can be obtained by hydrogenating the thus-obtained block copolymer precursor containing unhydrogenated block A, block B (or unhydrogenated block B) and block C, thereby converting at least 80% of carbon—carbon unsaturated bonds in the unhydrogenated block A to carbon—carbon saturated bonds. Incidentally, when the unhydrogenated block B of the block copolymer precursor also contains carbon—carbon unsaturated bonds, it is preferred to convert at least 80% of the carbon—carbon unsaturated bonds to carbon—carbon saturated bonds by the above-described hydrogenation.

Although limitation is not always imposed on the above-described hydrogenation, it can be conducted, for example, by subjecting the block copolymer precursor to catalytic hydrogenation in a solvent in the presence of a hydrogenation catalyst in a known manner. As a solvent used for the hydrogenation reaction, those inert to the hydrogenation reaction such as hexane, cyclohexane and toluene are preferred. Examples of the usable catalyst include heterogeneous catalysts such as a catalyst wherein a metal such as Pt, Pd, Ru, Rh or Ni is supported on a carrier such as carbon, alumina or diatomaceous earth, and Raney nickel; and Ziegler catalysts comprising combination of a transition metal compound with an organoaluminum compound, organolithium compound or the like. The other hydrogenation conditions are not essentially limited but the reaction is ordinarily effected at a hydrogen pressure within a range of normal pressure to 200 kg/cm$^2$, at a temperature within a range of room temperature to 250° C. and at a time within a range of 0.1 to 200 hours.

A process for obtaining the block copolymer of the present invention from the resulting reaction mixture after the above-described hydrogenation is not always limited, however, it can be obtained, for example, by bringing the reaction mixture containing the block copolymer into contact with a poor solvent such as methanol, thereby solidifying it, taking out and preliminarily drying the solidified material and then drying it by heating or under reduced pressure.

The block copolymer of the present invention is thermoplastic so that various molding or forming methods such as injection molding or extrusion can be applied to it and thereby, molded or formed products in various forms such as sheet, hose, box and ball can be obtained. The molded or formed products thus obtained have the properties of a vulcanized rubber such as flexibility and rubber elasticity (elastomeric properties), have excellent weather resistance and solvent resistance and moreover are excellent in adhesion to a polar polymer, adhesion to coating and heat resistance so that they are particularly advantageously employed for the applications such as automotive parts, sports goods, light electrical parts, electric wires or cables and civil engineering materials. Incidentally, the block copolymer of the present invention can be used in the form of a laminate or complex with a polar polymer such as poly(methyl methacrylate) (PMMA), ABS resin or polycarbonate by making the best use of good adhesion thereto.

The characteristics of the block copolymer of the present invention such as flexibility, affinity with a polar polymer, affinity with a non-polar polymer, heat resistance, weather resistance and solvent resistance effectively appear also in a polymer composition comprising the block copolymer of the present invention and at least one another polymer. In other words, the block copolymer of the present invention serves as a modifier (such as flexibilizer or polarity imparting agent) of the another polymer or serves as a compatibilizer when plural kinds of other polymers are employed. In addition, the block copolymer of the present invention can be effectively modified by the another polymer.

Preferred examples of the polymer which constitutes a polymer composition in combination with the block copolymer of the present invention include non-polar polymers typified by olefin-based polymers such as polyethylene, ethylene-α-olefin copolymers (ex. ethylene-1-octene copolymer) and polypropylene, and polar polymers typified by acrylic polymers such as poly(methyl methacrylate) (PMMA), vinyl chloride-based polymers such as polyvinyl chloride, vinylidene fluoride-based polymers such as polyvinylidene fluoride, acrylonitrile-styrene-based copolymers such as ABS resin and AS resin, and maleic anhydride-styrene copolymers. For example, since the block copolymer of the present invention has good compatibility with a polar polymer, use of the block copolymer and PMMA in combination makes it possible to prepare a flexible material having excellent properties derived from the PMMA such as transparency.

In a polymer composition comprising the block copolymer of the present invention, at least one another polar polymer and at least one non-polar polymer, the block copolymer can be permitted to serve as a compatibilizer. The preferable polymer composition for permitting the block copolymer of the present invention to serve as a compatibilizer, for example, comprises the block copolymer, another acrylic polymer and an olefin-based polymer.

Although limitation is not always imposed on the mixing ratio of the block copolymer of the present invention in the polymer composition comprising the block copolymer and at least one another polymer, a ratio of (weight of the block copolymer)/[weight of another polymer (when several kinds of polymers are employed, total of their weights)] usually falls within a range of from 1/97 to 97/3. For the purpose of making good use of the properties of the block copolymer of the present invention and imparting these properties with the properties of another polymer, the weight ratio of (block copolymer)/(another polymer), in general, preferably falls within a range of from 50/50 to 95/5. For the purpose of using the block copolymer of the present invention as a modifier of another polymer, the weight ratio of (block copolymer)/(another polymer), in general, preferably falls within a range of from 5/95 to 50/50. Within this range, the resulting polymer composition can effectively exhibit properties derived from the block copolymer of the present invention such as flexibility while making good use of the essential properties of another polymer. For the purpose of using the block copolymer as a compatibilizer of plural another polymers, on the other hand, the ratio of (the weight of the block copolymer)/(the total weight of another polymers), in general, preferably falls within a range of from 1/99 to 40/60. Within this range, the resulting polymer composition can effectively exhibit compatibility improving effects derived from the block copolymer of the present invention while making good use of the essential properties of each of another polymers.

The polymer composition comprising the block copolymer and another polymer can be prepared readily, for example, by kneading them under molten state.

The polymer composition comprising the block copolymer of the present invention and another polymer can be molded or formed into various shapes such as sheet, hose, box or ball by various methods such as injection molding or extrusion. The molded or formed products can be used advantageously for automotive parts, sports goods, light electrical parts, electric wires or cables or civil engineering materials.

As described above, the present invention provides block copolymers having good elastomeric properties, excellent weather resistance, solvent resistance and heat resistance, and good affinity with each of a polar polymer and a non-polar polymer. In the polymer composition comprising the block copolymer of the present invention and another polymer, the above-described characteristics of the block copolymer can be effectively exhibited.

The present invention will hereinafter be described specifically by examples. It should however be borne in mind that the present invention is not limited by them.

The polymers obtained in examples and comparative examples were analyzed in accordance with the methods as described below in (1) and (2).

(1) Measurement of a 1,2-bond content in the butadiene-based polymer block before hydrogenation From the reaction mixture after completion of a predetermined polymerization step, a sample was collected and it was distilled under reduced pressure to remove the solvent sufficiently. The residue was then dissolved in deuterated chloroform. The resulting solution was subjected to nuclear magnetic resonance absorption measurement. As to the signals thus obtained, an integral ratio of the peak around 5.0 ppm derived from the 1,2-bond to the peak around 5.4 ppm derived from the 1,4-bond, each in polybutadiene, was found and based on the results, the 1,2-bond content was determined.

(2) Judgment whether the polymer block has crystallinity or not and measurement of glass transition point The polymer sample was dried under vacuum at 60° C. for 20 hours, followed by compression molding at 220° C. The resulting test piece was subjected to differential scanning calorimetry at a heating rate of 10° C./min in a temperature range of from −150° C. to +250° C. The temperature at which a change in a specific heat due to the glass transition of the polymer block in the polymer was recognized was designated as the glass transition point (Tg) of the polymer block. When the endothermic peak due to crystal fusion of the polymer block was recognized, the polymer block was judged to have crystallinity. Referential Example 1 [Preparation example of a triblock copolymer composed of (polybutadiene having a low 1,2-bond content)-(polybutadiene having a high 1,2-bond content)-(poly(methyl methacrylate))]

In a 1-liter autoclave internally purged with nitrogen, 270 g of deaerated and dehydrated methylcyclohexane and 0.108 g of s-butyl lithium (which will hereinafter be abbreviated as "s-BuLi") were charged. To the resulting mixture, 10.5 g of 1,3-butadiene was added, followed by heating to 40° C. at which polymerization was effected for 3 hours. A portion of the resulting polymer was sampled and analyzed by gel permeation chromatography (which will hereinafter be abbreviated as "GPC") and nuclear magnetic resonance absorption measurement (which will hereinafter be abbreviated as "NMR"), whereby a number-average molecular weight (which will hereinafter be abbreviated as "Mn"), a weight-average molecular weight/number-average molecular weight ratio (which will hereinafter be abbreviated as "Mw/Mn") and a 1,2-bond content were determined. As a result, it was found that a low 1,2-bond content polybutadiene having Mn of 6200, Mw/Mn of 1.04 and 1,2-bond content of 6% was formed.

After the polymerization, 1.4 g of deaerated and dehydrated tetrahydrofuran was charged in the polymerization system, followed by the addition of 49 g of 1,3-butadiene. The resulting mixture was polymerized at 40° C. for 3 hours. A portion of the resulting polymer was sampled and the second block thus formed was analyzed by GPC and NMR. As a result, it was found that a high 1,2-bond content polybutadiene block having Mn of 28900, Mw/Mn of 1.09 and 1,2-bond content of 59% was formed as the second block.

To the resulting polymerization system, 0.6 g of deaerated and dehydrated 1,1-diphenylethylene was added, followed by cooling to 0° C. Then, 310 g of deaerated and dehydrated tetrahydrofuran was added and the mixture was reacted for 1 hour under stirring. After the polymerization system was cooled to −80° C., 10.5 g of methyl methacrylate was added and the mixture was polymerized for 3 hours. To the polymerization system, 0.8 g of methanol was added to terminate the polymerization.

A small amount of the resulting polymer was sampled after the termination of the polymerization and analyzed by GPC and NMR. As a result, it was found that a poly(methyl methacrylate) block having Mn of 6200 and Mw/Mn of 1.18 was formed as the third block. In the end, the formation of the triblock copolymer composed of (low 1,2-bond content polybutadiene)-(high 1,2-bond content polybutadiene)-(poly(methyl methacrylate)) and having Mn of 42200 and Mw/Mn of 1.18 was confirmed.

By pouring the resulting polymer solution into 8000 g of methanol to solidify the polymer, collecting the solidified polymer and drying it under vacuum at 30° C. for 20 hours, 65 g of the above-described triblock copolymer was obtained.

Example 1 [Preparation example of a triblock copolymer composed of (hydrogenation product of polybutadiene having a low 1,2-bond content)-(hydrogenation product of polybutadiene having a high 1,2-bond content)-(poly(methyl methacrylate))]

In a 1-liter autoclave internally purged with nitrogen, 55 g of the block copolymer obtained in Referential Example 1 was dissolved in 520 g of deaerated and dehydrated toluene. To the resulting solution, 3.2 g of a 1:3 (molar ratio) mixture of nickel octylate and triisobutylaluminum was added as a hydrogenation catalyst, followed by heating to 80° C. The system was fed with a hydrogen gas until it amounted to 10 kg/cm$^2$. Under those conditions, the reaction was effected for 10 hours.

The hydrogenation was terminated by the addition of 8 g of a 30 wt. % aqueous hydrogen peroxide solution and 8.6 g of citric acid. The reaction mixture was then washed twice each with 800 g of distilled water. The polymer solution thus obtained was poured into 8000 g of methanol to solidify the polymer. The solidified polymer was collected and then dried under vacuum at 60° C. over 20 hours, whereby 50 g of the polymer was obtained.

As a result of NMR measurement of the resulting polymer, it was found that 97% of unsaturated bonds contained in the polybutadiene moiety was hydrogenated and converted into saturated bonds. As results of GPC and NMR, it was confirmed that a polymer composed of 15 wt. % of a block of hydrogenation product of polybutadiene having a low 1,2-bond content, 70 wt. % of a block of hydrogenation product of polybutadiene having a high 1,2-bond content and 15 wt. % of a poly(methyl methacrylate) block and having Mn of 42500 and Mw/Mn of 1.18 was obtained. According to those findings, it was confirmed that a triblock copolymer of (hydrogenation product of polybutadiene having a low 1,2-bond content)-(hydrogenation product of polybutadiene having a high 1,2-bond content)-(poly(methyl methacrylate)) was prepared.

As a result of differential scanning calorimetry of the resulting triblock copolymer, a change in a specific heat due to glass transition of the block of hydrogenation product of polybutadiene having a high 1,2-bond content, an endothermic peak due to crystal fusion of the block of hydrogenation product of polybutadiene having a low 1,2-bond content and a change in a specific heat due to glass transition of the poly(methyl methacrylate) block were observed at −70° C., 110° C. and 120° C., respectively.

The analytical results of the resulting triblock copolymer are shown collectively in Table 1.

Referential Example 2 [Preparation example of a triblock copolymer composed of (polybutadiene having a low 1,2-bond content)-(polyisoprene)-(poly(methyl methacrylate))]

In a 1-liter autoclave internally purged with nitrogen, 270 g of deaerated and dehydrated methylcyclohexane and 0.072 g of s-BuLi were charged, followed by the addition of 7 g of 1,3-butadiene. The resulting mixture was heated to 40° C. at which polymerization was effected for 3 hours. A portion of the resulting polymer was sampled and subjected to GPC and NMR analysis. As a result, it was found that polybutadiene having a low 1,2-bond content whose Mn was 6200, Mw/Mn was 1.08 and 1,2-bond content was 6% was formed.

After completion of the above polymerization, 56 g of isoprene was charged in the system and polymerization was conducted at 40° C. for 3 hours. A portion of the resulting polymer was sampled and subjected to GPC and NMR analysis. As a result, it was found that a polyisoprene block having Mn of 49500 and Mw/Mn of 1.05 was formed as the second block.

In the resulting polymeric system, 0.4 g of deaerated and dehydrated 1,1-diphenylethylene was charged, followed by cooling to 0° C. After the addition of 310 g of deaerated and dehydrated tetrahydrofuran, reaction was carried out for 1 hour under stirring. To the polymerization system cooled to −80° C., 7 g of methyl methacrylate was added, followed by polymerization for 3 hours. By the addition of 0.5 g of methanol to the polymerization system, polymerization was terminated.

Upon termination of the polymerization, a small amount of the polymer was sampled and subjected to GPC and NMR analysis. As a result, it was found that a poly(methyl methacrylate) block having Mn of 6200 and Mw/Mn of 1.18 was formed as the third block. It was confirmed in the end that a triblock copolymer composed of (polybutadiene having a low 1,2-bond content)-(polyisoprene)-(poly(methyl methacrylate)) and having Mn of 62000 and Mw/Mn of 1.18 was formed.

The polymer solution thus obtained was poured into 8000 g of methanol to solidify the polymer and the solidified polymer was collected and dried under vacuum at 30° C. over 20 hours, whereby 65 g of the above-described triblock copolymer was obtained.

Example 2 [Preparation example of a triblock copolymer composed of (hydrogenation product of polybutadiene having a low 1,2-bond content)-(hydrogenated polyisoprene)-(poly(methyl methacrylate))]

In a 1-liter autoclave internally purged with nitrogen, 55 g of the block copolymer obtained in Referential Example 2 was dissolved in 520 g of deaerated and dehydrated toluene. To the resulting solution, 2.8 g of a 1:3 (molar ratio) mixture of nickel octylate and triisobutylaluminum was added as a hydrogenation catalyst, followed by heating to 80° C. A hydrogen gas was then fed to the system to 10 kg/cm$^2$. Reaction was effected for 14 hours under those conditions.

By the addition of 7 g of a 30 wt. % aqueous solution of hydrogen peroxide and 7.4 g of citric acid, the hydrogenation was terminated. The reaction mixture was washed twice each with 800 g of distilled water. The resulting polymer solution was poured into 8000 g of methanol to solidify the polymer and the solidified polymer was collected and then dried under vacuum at 60° C. over 20 hours, whereby 50 g of a polymer was obtained.

The resulting polymer was subjected to NMR measurement. As a result, it was confirmed that 99% of unsaturated bonds contained in the polybutadiene block and 90% of unsaturated bonds contained in the polyisoprene block had been both hydrogenated and converted into saturated bonds. As a result of GPC and NMR analysis, it was confirmed that the polymer thus obtained was formed of 10 wt. % of a block of hydrogenation product of polybutadiene having a low 1,2-bond content, 80 wt. % of a hydrogenated polyisoprene block and 10 wt. % of a poly(methyl methacrylate) block and had Mn of 63500 and Mw/Mn of 1.18. From those findings, it was elucidated that a triblock copolymer composed of (hydrogenation product of polybutadiene having a low 1,2-bond content)-(hydrogenated polyisoprene)-(poly(methyl methacrylate)) was formed.

As a result of differential scanning calorimetry of the resulting triblock copolymer, a change in a specific heat due to glass transition of the hydrogenated polyisoprene block, an endothermic peak due to crystal fusion of the block of hydrogenation product of polybutadiene having a low 1,2-bond content and a change in a specific heat due to glass transition of the poly(methyl methacrylate) block were observed at −65° C., 110° C. and 120° C., respectively.

The analytical results of the resulting triblock copolymer are shown collectively in Table 1.

Example 3

In a similar manner to Referential Example 1 and Example 1 except that charged amounts of the polymerization initiator and each monomer had been changed, polymerization, separation of a block copolymer precursor, hydrogenation, and separation of the block copolymer were carried out, whereby a triblock copolymer composed of (hydrogenation product of polybutadiene having a low 1,2-bond content)-(hydrogenation product of polybutadiene having a high 1,2-bond content) - (poly(methyl methacrylate)) was prepared. The analytical results of the resulting triblock copolymer are shown in Table 1.

Example 4

In a similar manner to Referential Example 2 and Example 2 except that charged amounts of the polymerization initiator and each monomer were changed, polymerization, separation of the block copolymer precursor, hydrogenation and separation of the block copolymer were carried out, whereby a triblock copolymer composed of (hydrogenation product of polybutadiene having a low 1,2-bond content)-(hydrogenated polyisoprene)-(poly(methyl methacrylate)) was prepared. The analytical results of the resulting triblock copolymer are shown in Table 1.

addition of 24.5 g of 1,3-butadiene. The resulting mixture was polymerized at 40° C. for 3 hours. A portion of the resulting polymer was sampled and subjected to GPC and NMR analysis. As a result, it was found that a polybutadiene block having a high 1,2-bond content whose Mn was 14500, Mw/Mn was 1.08 and 1,2-bond content was 59% was formed as the second block.

To the resulting polymerization system, 0.32 g of sufficiently deaerated 1,2-dibromoethane was added, followed by heating to 50° C. at which reaction was effected for 4 hours to couple the polymers. Then, 0.8 g of methanol was added to the polymerization system, whereby polymerization was terminated.

After termination of the polymerization, a small amount of the polymer was sampled and subjected to GPC and NMR analysis. As a result, it was confirmed that a triblock copolymer composed of (polybutadiene having a low 1,2-bond content)-(polybutadiene having a high 1,2-bond content)-(polybutadiene having a low 1,2-bond content) and having Mn of 42200 and Mw/Mn of 1.13 was obtained.

In a similar manner to Referential Example 1, the polymer was collected, and then it was subjected to hydrogenation as in Example 1, whereby a triblock copolymer composed of (hydrogenation product of polybutadiene having a low 1,2-

TABLE 1

| | | Example 1 | Example 2 | Example 3 | Example 4 |
|---|---|---|---|---|---|
| Block A | Mn before hydrogenation | 6200 | 6200 | 27000 | 35000 |
| | 1,2-Bond content | 6% | 6% | 6% | 7% |
| | Hydrogenation ratio | at least 83% | 99% | at least 94% | 99% |
| | Crystal fusion Temp. after hydrogenation | 110° C. | 110° C. | 110° C. | 110° C. |
| Block B | Structure of polymer | Hydrogenation product of polybutadiene having high 1,2-bond content | Hydrogenated polyisoprene | Hydrogenation product of polybutadiene having high 1,2-bond content | Hydrogenated polyisoprene |
| | Mn before hydrogenation | 28900 | 49500 | 31000 | 45000 |
| | Hydrogenation ratio | at least 96% | 90% | at least 94% | 70% |
| | Tg after hydrogenation | −70° C. | −65° C. | −70° C. | −66° C. |
| Block C | Structure of polymer | Poly(methyl methacrylate) | Poly(methyl methacrylate) | Poly(methyl methacrylate) | Poly(methyl methacrylate) |
| | Mn | 6200 | 6200 | 11000 | 14000 |
| Block copolymer (whole) | Mn | 42500 | 63500 | 71000 | 97000 |
| | Hydrogenation ratio (whole) | 97% | 91% | 97% | 83% |

Comparative Example 1 [Preparation example of a triblock copolymer composed of (hydrogenation product of polybutadiene having a low 1,2-bond content)-(hydrogenation product of polybutadiene having a high 1,2-bond content)-(hydrogenation product of polybutadiene having a low 1,2-bond content)]

In a 1-liter autoclave internally purged with nitrogen, 270 g of deaerated and dehydrated cyclohexane and 0.108 g of s-BuLi were charged, followed by the addition of 10.5 g of 1,3-butadiene. The mixture was heated to 40° C., at which polymerization was effected for 3 hours. A portion of the resulting polymer was sampled and subjected to GPC and NMR analysis. As a result, it was found that polybutadiene having a low 1,2-bond content whose Mn was 6200, Mw/Mn was 1.04 and 1,2-bond content was 6% was formed.

To the resulting polymerization system, 1.4 g of deaerated and dehydrated tetrahydrofuran was added, followed by the bond content)-(hydrogenation product of polybutadiene having a high 1,2-bond content)-(hydrogenation product of polybutadiene having a low 1,2-bond content) was obtained. As a result of differential scanning calorimetry of the resulting polymer, a change in the specific heat due to the glass transition of the moiety of hydrogenation product of polybutadiene having a high 1,2-bond content and an endothermic peak due to the crystal fusion of the moiety of hydrogenation product of polybutadiene having a low 1,2-bond content were observed at −70° C. and 110° C., respectively.

Comparative Example 2 [Preparation example of a triblock copolymer composed of (polystyrene)-(hydrogenated polyisoprene)-(polystyrene)]

In a 1-liter autoclave internally purged with nitrogen, 270 g of deaerated and dehydrated cyclohexane and 0.108 g of s-BuLi were charged, followed by the addition of 10.5 g of styrene. The mixture was heated to 40° C., at which polymerization was effected for 3 hours. A portion of the resulting polymer was sampled and subjected to GPC and NMR analysis. As a result, it was found that polystyrene having Mn of 6200 and Mw/Mn of 1.04 was formed.

After the above-described polymerization, 49 g of isoprene was charged in the system and polymerized at 40° C. for 3 hours. A portion of the resulting polymer was sampled and subjected to GPC and NMR analysis. As a result, it was found that a polyisoprene block having Mn of 29000 and Mw/Mn of 1.08 was formed as the second block.

To the resulting polymerization system, 10.5 g of styrene was added and polymerization was effected at 40° C. for 3 hours. Then, 0.8 g of methanol was added to the polymerization system, whereby polymerization was terminated.

After termination of the polymerization, a small amount of the polymer was sampled and subjected to GPC and NMR analysis. As a result, it was confirmed that a triblock copolymer composed of (polystyrene)-(polyisoprene)-(polystyrene) and having Mn of 42200 and Mw/Mn of 1.13 was obtained consequently.

In a similar manner to Referential Example 1, the polymer was collected, and then it was subjected to hydrogenation as in Example 1, whereby a triblock copolymer composed of (polystyrene)-(hydrogenated polyisoprene)-(polystyrene) was obtained. As a result of differential scanning calorimetry of the resulting polymer, a change in a specific heat due to glass transition of the hydrogenated polyisoprene moiety and a change in a specific heat due to glass transition of the polystyrene moiety were observed at −65° C. and 100° C., respectively.

Evaluation Tests

The polymers obtained in the above-described Examples and Comparative Examples were subjected to various evaluation tests in accordance with the below-described methods.

(1) Tensile Test

After drying at 60° C. for 20 hours, a sample of the polymer was compression molded at 220° C. From the sheet-like sample thus prepared, a No. 3 dumbbell was punched out as described in "Physical Testing Method of Vulcanized Rubber" of JIS standards (JIS K 6301). A tensile test was carried out under the condition of a stress rate of 500 mm/min by using the dumbbell and its breaking strength and elongation were measured.

(2) Weather resistance test

After drying at 60° C. for 20 hours, a polymer sample was compression molded at 220° C. From the sheet thus obtained, a sample piece of 5 cm×5 cm was cut out and subjected to weather resistance test for 500 hours in a xenon arc weatherometer. The hue of each sample piece was visually observed before and after the test.

(3) Solvent resistance test

A polymer sample piece (0.1 g) was immersed in 10 ml of a testing solvent (each of three solvents, that is, hexane, cyclohexane and toluene) and allowed to stand overnight at room temperature to test its solvent resistance. The state of the sample piece after the test was visually observed. When neither swelling nor dissolution was recognized, it was judged "insoluble"; when swelling was recognized in a portion of the sample piece, it was judged "partially swelled"; and when the sample piece was dissolved in the solvent completely, it was judged "easily soluble".

(4) Test on adhesion to polar resin

After drying at 60° C. for 20 hours, a polymer sample was compression molded at 220° C. From the sheet so obtained, a sample piece of 10 cm×5 cm was cut out. An adherend of 10 cm×5 cm (plate) was prepared by injection molding a test polar resin (each of PMMA, ABS and polycarbonate (PC)). The above-described sample piece and the adherend were stacked so that they adhered closely at the portion of 5 cm×5 cm, followed by compression molding for 2 minutes under the conditions of 210° C. and 20 kgf/cm$^2$, whereby adhesion test was carried out. After the test, it was judged whether they adhered each other.

Results of the above-described various evaluation tests are shown in Table 2.

TABLE 2

|  |  | Example 1 | Example 2 | Example 3 | Example 4 | Comp. Ex. 1 | Comp. Ex. 2 |
|---|---|---|---|---|---|---|---|
| Tensile test results | Breaking strength (kgf/cm$^2$) | 45 | 60 | 85 | 180 | 30 | 100 |
|  | Elongation (%) | 390 | 450 | 720 | 750 | 290 | 550 |
| Weather resistance test results | Hue (before test) | Colorless & transparent | Colorless & transparent | Colorless & transparent | Colorless & transparent | Colorless & transparent | Colorless & transparent |
|  | Hue (after test) | Colorless & transparent | Colorless & transparent | Colorless & transparent | Colorless & transparent | Colorless & transparent | Turbid |
| Solvent resistance test results | Hexane | Insoluble | Insoluble | Insoluble | Insoluble | Insoluble | Partially swelled |
|  | Cyclohexane | Insoluble | Insoluble | Insoluble | Insoluble | Insoluble | Easily soluble |
|  | Toluene | Partially swelled | Partially swelled | Partially swelled | Partially swelled | Partially swelled | Easily soluble |
| Adhesion test results | PMMA | Adhered | Adhered | Adhered | Adhered | Not adhered | Not adhered |
|  | ABS | Adhered | Adhered | Adhered | Adhered | Not adhered | Not adhered |
|  | PC | Adhered | Adhered | Adhered | Adhered | Not adhered | Not adhered |

From the above Table 2, it has been found that the block copolymers of the present invention obtained in Examples 1 to 4 have mechanical properties almost as excellent as SEPS which is a styrene-based thermoplastic elastomer obtained in Comparative Example 2 judging from their high breaking strength and large elongation. It has also been found that the block copolymers according to the present invention have excellent weather resistance, solvent resistance and adhesion to a polar resin, judging from that no change occurred in their hue in the weather resistance test, they were evaluated as "insoluble" or "partially swelled" in the solvent resistance test and each of them adhered to a polar resin in the adhesion test.

It has been found, on the other hand, that the styrene-based thermoplastic elastomer obtained in Comparative Example 2 not according to the present invention is inferior in weather resistance, solvent resistance and adhesion to a polar resin judging from that a change in color hue appeared in the weather resistance test, it was evaluated as "partially swelled" or "easily soluble" in the solvent resistance test and it did not adhere to a polar resin in the adhesion test. It has also been found that the hydrogenation product of block copolymer having two polybutadiene blocks having a low 1,2-bond content and one polybutadiene block having a high 1,2-bond content, obtained in Comparative Example 1 not according to the present invention did not adhere to a polar resin, indicating inferiority in the adhesion to a polar resin.

Examples 5 and 6 [Composition of a block copolymer and PMMA]

In Example 5 or 6, the block copolymer obtained in a similar manner to Example 3 and poly(methyl methacrylate) ("HR-L", trade name; product of Kuraray Co., Ltd.) were used at a weight ratio of 70:30 (Example 5) or 50:50 (Example 6). They were kneaded under molten state for 10 minutes in a Brabender type melting and kneading apparatus ("LABO PLASTOMILL", trade name; manufactured by TOYOSEIKI SEISAKU-SHO, LTD.) under the conditions of a temperature of 230° C. and screw speed of 100 rpm.

The appearance (color, transparency) of the polymer composition thus obtained was visually evaluated, surface hardness (JIS Hardness A) was measured at 25° C., and compression set was measured following the method as specified in JIS K 6301 (compression conditions: 70° C., 22 hours). The results are shown in Table 3.

Comparative Example 3 (Composition of a block copolymer and PMMA)

In a similar manner to Example 6 except for the use of the block copolymer obtained as in Comparative Example 2 instead of the block copolymer obtained as in Example 3, a polymer composition was prepared and evaluated. The results are shown in Table 3.

Examples 5 and 6 have favorable transparency, reflecting good affinity (compatibility) between the block copolymer of the present invention and poly(methyl methacrylate) (PMMA), have flexibility evaluated in terms of surface hardness, and have excellent heat resistance evaluated in terms of compression set. It has been found, on the other hand, that the polymer composition of Comparative Example 3 comprising a block copolymer different from the block copolymer of the present invention is inferior in transparency and heat resistance.

Comparative Example 4 [Preparation example of a diblock copolymer composed of (hydrogenation product of polybutadiene having a low 1,2-bond content)-(poly(methyl methacrylate))]

In a similar manner to Referential Example 1 except that toluene was used in stead of methylcyclohexane as a polymerization solvent in the first polymerization step (the step for forming a polybutadiene having a low 1,2-bond content); the second polymerization step (the step for forming a polybutadiene block having a high 1,2-bond content) was omitted (in other words, the first polymerization step was directly followed by the third polymerization step (the step for forming a poly(methyl methacrylate) block)); and charged amounts of the polymerization initiator and monomers were changed, polymerization and separation procedures were carried out, whereby a diblock copolymer composed of (polybutadiene having a low 1,2-bond content)-(poly(methyl methacrylate)) was obtained. The polybutadiene block of the resulting diblock copolymer was found to have Mn of 22000, Mw/Mn of 1.09 and 1,2-bond content of 7%. The poly(methyl methacrylate) block was found to have Mn of 23000 and Mw/Mn of 1.18.

In a similar manner to Example 1 except for the use of the diblock copolymer thus obtained, hydrogenation and separation procedures were carried out, whereby a diblock copolymer composed of (hydrogenation product of polybutadiene having a low 1,2-bond content)-(poly(methyl methacrylate)) was obtained. It was confirmed that the hydrogenation converted 98% of unsaturated bonds contained in the unhydrogenated polybutadiene moiety to hydrogenated saturated bonds.

As a result of GPC and NMR analysis, the finally-obtained diblock copolymer was confirmed to be a polymer having Mn of 49000 and Mw/Mn of 1.12 and composed of

TABLE 3

|  |  | Ex. 3 | Ex. 5 | Ex. 6 | Comp. Ex. 3 |
| --- | --- | --- | --- | --- | --- |
| Component (parts by weight) | PMMA | 0 | 30 | 50 | 50 |
|  | Block copolymer of Example 3 | 100 | 70 | 50 | 0 |
|  | Block copolymer of Comp. Ex. 2 | 0 | 0 | 0 | 50 |
| Evaluation results | Appearance | Colorless & transparent | Colorless & transparent | Colorless & transparent | Opaque |
|  | Surface hardness (JIS A) | 72 | 78 | 86 | 88 |
|  | Compression set | 46% | 48% | 55% | 95% |

For reference, Table 3 includes evaluation results of the block copolymer obtained in a similar manner to Example 3 and not mixed with PMMA.

It has been found from the results in Table 3 that the polymer compositions of the present invention obtained in 52 wt. % of a block of hydrogenation product of polybutadiene having a low 1,2-bond content and 48 wt. % of a poly(methyl methacrylate) block. As a result of differential scanning calorimetry of the finally-obtained diblock copolymer, an endothermic peak due to crystal fusion of the block of hydrogenation product of polybutadiene having a low 1,2-bond content and a change in specific heat due to glass transition of the poly(methyl methacrylate) block were observed at 110° C. and 120° C., respectively.

Examples 7 and 8 [Ethylene-1-octene copolymer/PMMA/block copolymer compositions]

In Example 7 or 8, the block copolymer obtained in a similar manner to Example 3, poly(methyl methacrylate) ("HR-L", trade name; product of Kuraray Co., Ltd.) and an ethylene-1-octene copolymer ("Engage 8200", trade name; product of Du Pont Dow Elastomer Inc.) were used at a weight ratio of 33:33:33 (Example 7) or 15:25:60 (Example 8). They were kneaded under molten state for 10 minutes in a Brabender type melting and kneading apparatus ("LABO PLASTOMILL", trade name; manufactured by TOYOSEIKI SEISAKU-SHO, LTD.) under the conditions of a temperature of 230° C. and screw rate of 100 rpm.

Concerning the polymer composition thus obtained, appearance (color, transparency) was visually evaluated, breaking strength and elongation were measured in accordance with the above-described method for tensile test, surface hardness (JIS Hardness A) was measured at 25° C., and compression set was measured following the method as specified in JIS K 6301 (compression conditions: 70° C., 22 hours). The results are shown in Table 4.

Figure 1:
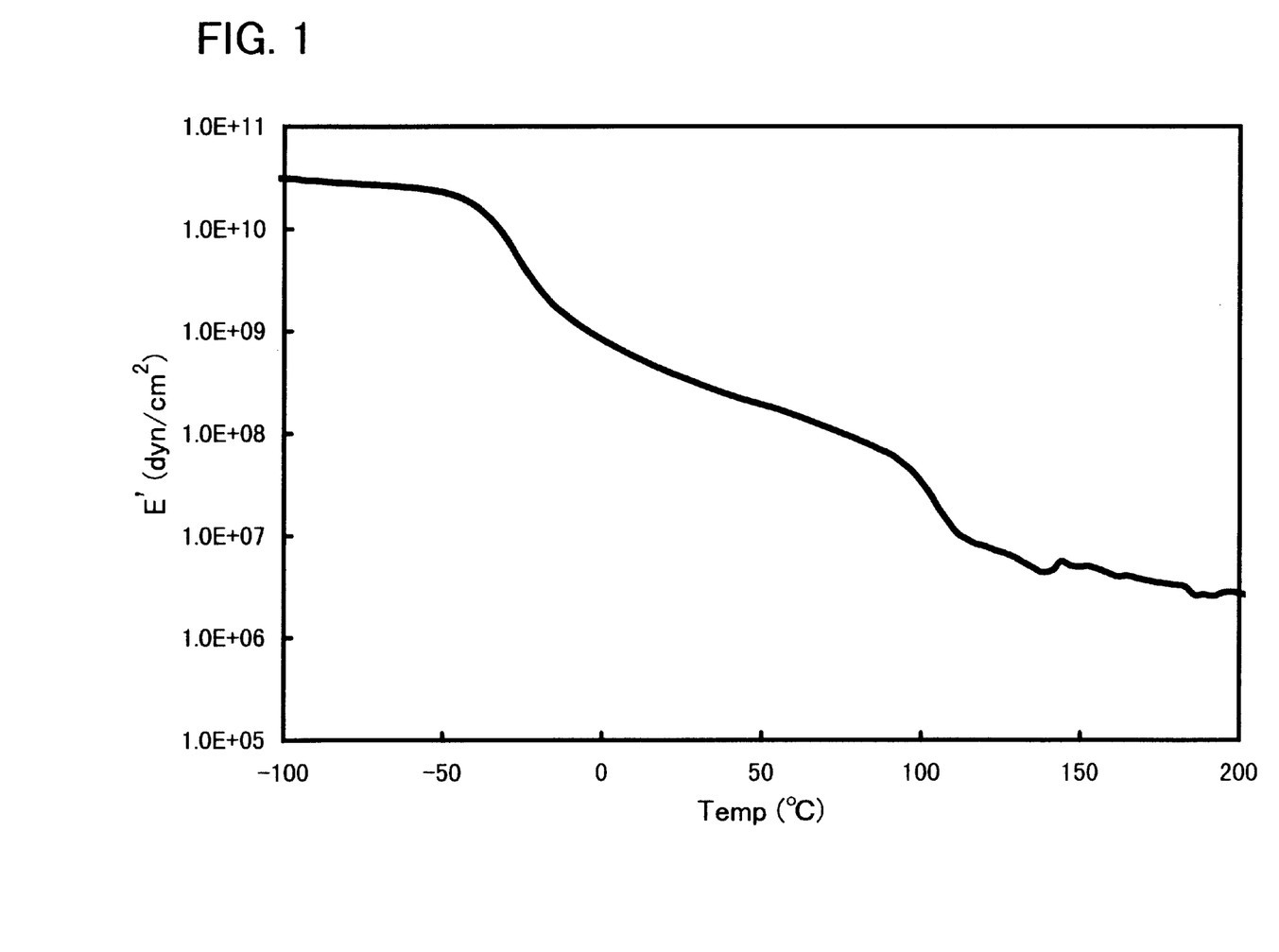
FIG. 1 is a graph illustrating a temperature-dependent change in storage elastic modulus (E') of the polymer composition obtained in Example 7 in accordance with the present invention.

The polymer composition obtained in Example 7 was compression molded into a plate-like test piece of 1 mm thick and 5 mm wide. The dynamic viscoelastic behavior of the test piece was measured between pulling jigs of 30 mm apart at a frequency of 11 Hz. As a measuring instrument, "DVE-V4 FT RHEOSPECTRER" (trade name; manufactured by RHEOLOGY CO., LTD.) was employed. The storage elastic modulus (E') thus measured is diagrammatically illustrated in FIG. 1 as a function of a temperature.

Comparative Example 5 [Ethylene-1-octene copolymer/PMMA composition]

In a similar manner to Example 7 except for the use of poly(methyl methacrylate) ("HR-L", trade name; product of Kuraray Co., Ltd.) and an ethylene-1-octene copolymer ("Engage 8200", trade name; product of Du Pont Dow Elastomer Inc.) at a weight ratio of 50:50, kneading was carried out under molten state, whereby a polymer composition was obtained. The polymer composition thus obtained was subjected to various evaluations and their results are shown in Table 4.

Comparative Example 6 [Ethylene-1-octene copolymer/PMMA/block copolymer composition]

Figure 2:
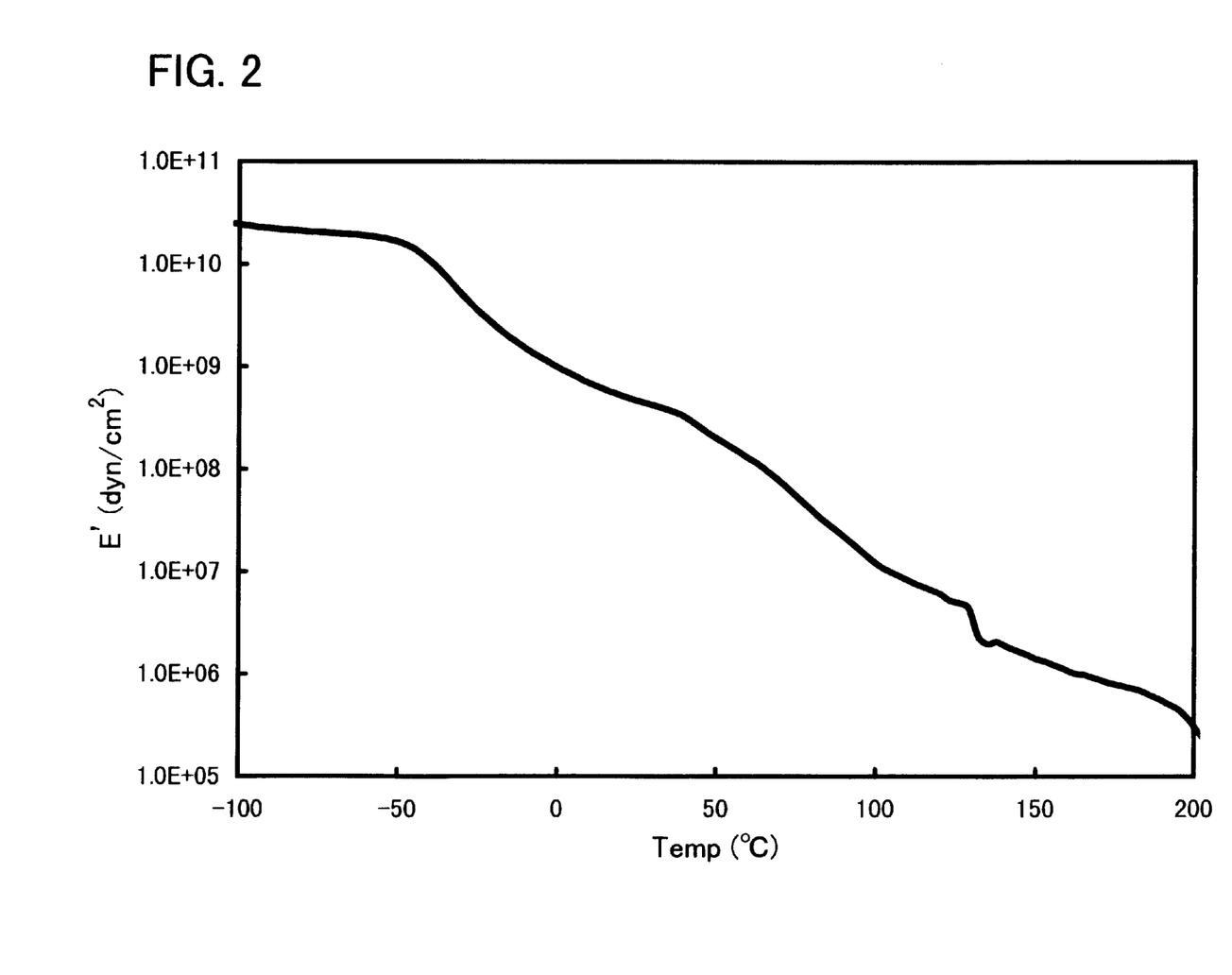
FIG. 2 is a graph illustrating temperature-dependent change in storage elastic modulus (E') of the polymer composition obtained in Comparative Example 6 not in accordance with the present invention.

In a similar manner to Example 7 except for the use of the diblock copolymer obtained as in Comparative Example 4, poly(methyl methacrylate) ("HR-L", trade name; product of Kuraray Co., Ltd.) and an ethylene-1-octene copolymer ("Engage 8200", trade name; product of Du Pont Dow Elastomer Inc.) at a weight ratio of 8:25:67, kneading was carried out under molten state, whereby a polymer composition was obtained. The polymer composition thus obtained was subjected to various evaluations and its dynamic viscoelastic behavior was measured. Results are shown in Table 4. The storage elastic modulus (E') obtained by the measurement of dynamic viscoelastic behavior is diagrammatically illustrated in FIG. 2 as a function of a temperature.

Comparative Example 7 (Ethylene-1-octene copolymer/PMMA/block copolymer composition)

In a similar manner to Example 7 except for the use of the triblock copolymer obtained as in Comparative Example 2, poly(methyl methacrylate) ("HR-L", trade name; product of Kuraray Co., Ltd.) and an ethylene-1-octene copolymer ("Engage 8200", trade name; product of Du Pont Dow Elastomer Inc.) at a weight ratio of 15:25:60, kneading was carried out under molten state, whereby a polymer composition was obtained. The polymer composition thus obtained was subjected to various evaluations. Results are shown in Table 4.

TABLE 4

|  |  | Ex. 7 | Ex. 8 | Comp. Ex. 5 | Comp. Ex. 6 | Comp. Ex. 7 |
|---|---|---|---|---|---|---|
| Component (parts by weight) | Ethylene-1-octene copolymer | 33 | 60 | 50 | 67 | 60 |
|  | PMMA | 33 | 25 | 50 | 25 | 25 |
|  | Triblock copolymer of Ex. 3 | 33 | 15 | 0 | 0 | 0 |
|  | Diblock copolymer of Comp. Ex. 4 | 0 | 0 | 0 | 8 | 0 |
|  | Triblock copolymer of Comp. Ex. 2 | 0 | 0 | 0 | 0 | 15 |
| Evaluation results | Appearance | Colorless & transparent | Colorless & transparent | White | Colorless & transparent | White |
|  | Tensile test: breaking strength (kgf/cm$^2$) | 75 | 71 | 42 | 59 | 40 |
|  | Tensile test: elongation (%) | 490 | 730 | 950 | 750 | 560 |
|  | Surface hardness (JIS A) | 82 | 72 | 86 | 84 | 84 |
|  | Compression set | 66% | 79% | ≧100% | ≧100% | 98% |

From the results shown in Table 4, it has been found that the polymer composition obtained in Comparative Example 5 not according to the present invention and comprising only two components, that is, an ethylene-1-octene copolymer (metallocene-based TPE) and PMMA is insufficient in transparency evaluated in terms of appearance, tensile properties evaluated in terms of break strength and heat resistance evaluated in terms of compression set, while the polymer composition of the present invention obtained in Example 7 comprising, in addition the above-described two components, the block copolymer of the present invention has largely improved transparency, tensile properties and heat resistance. The result shows that the incorporation of the block copolymer of the present invention brings about an improvement in the compatibility between the metallocene-based TPE and PMMA.

In addition, it has been found from Table 4 that the polymer composition of the present invention obtained in Example 8 has excellent transparency, tensile properties, heat resistance and the like, similar to the polymer composition obtained in Example 7, while the polymer compositions of Comparative Examples 6 and 7 comprising a block copolymer different from the block copolymer of the present invention are insufficient in tensile properties evaluated in terms of break strength, and heat resistance evaluated in terms of compression set, in spite of having surface hardness on a level with the polymer composition of Example 7.

From the graph (FIG. 1) of a temperature-dependent change in the storage elastic modulus (E') of the polymer composition of the present invention obtained in Example 7, it has been found that the storage elastic modulus is maintained until about 100° C. under temperature-elevating conditions. It has been found, on the other hand, from the graph (FIG. 2) of a temperature-dependent change in the storage elastic modulus (E') of the polymer composition obtained in Comparative Example 6 and comprising a block copolymer different from the block copolymer of the present invention that a phenomenon of lowering of the storage elastic modulus is recognized at about 50° C. under temperature-elevating conditions. These findings suggest the high heat resistance of the block copolymer of the present invention and also the polymer composition comprising same.

What is claimed is:

1. A block copolymer comprising, in a main chain thereof, at least one polymer block A, at least one polymer block B and at least one polymer block C, said polymer block A being obtained by hydrogenation of at least 80% of unsaturated bonds of a butadiene-based polymer block having a 1,2-bond content less than 20% and having crystallinity; said polymer block B having a glass transition point not higher than 20° C.; and said polymer block C being composed mainly of a methacrylate ester unit and/or an acrylate ester unit and having a glass transition point exceeding 20° C.

2. A block copolymer according to claim 1, wherein in at least a part of the main chain, at least one polymer block B has been sandwiched between at least one polymer block A and at least one polymer block C.

3. A block copolymer according to claim 1, which has, in at least a part of the main chain, a structure represented by the formula: [A]—[B]—[C], wherein [A] represents the polymer block A, [B] represents the polymer block B [C] represents the polymer block C and a solid line (—) stands for direct chemical bonding of polymer blocks at both ends of the solid line or bonding via a partial structure derived from a coupling agent.

4. A polymer composition comprising a block copolymer comprising, in a main chain thereof, at least one polymer block A, at least one polymer block B and at least one polymer block C, said polymer block A being obtained by hydrogenation of at least 80% of unsaturated bonds of a butadiene-based polymer block having a 1,2-bond content less than 20% and having crystallinity; said polymer block B having a glass transition point not higher than 20° C.; and said polymer block C being composed mainly of a methacrylate ester unit and/or an acrylate ester unit and having a glass transition point exceeding 20° C., and at least one another polymer.

5. A polymer composition according to claim 4, wherein said another polymer is at least one polymer selected from the group consisting of olefin-based polymers, acrylic polymers, vinyl chloride-based polymers, vinylidene fluoride-based polymers, maleic anhydride-styrene-based copolymers and acrylonitrile-styrene-based copolymers.

6. A polymer composition according to claim 4, wherein said another polymer is a combination of a polar polymer other than said block copolymer and a non-polar polymer.

7. A polymer composition according to claim 4, wherein said another polymer is a combination of an acrylic polymer other than said block copolymer and an olefin-based polymer other than said block copolymer.

* * * * *